No. 673,322. Patented Apr. 30, 1901.
B. G. LUTHER.
EDGING MACHINE.
(Application filed Sept. 12, 1899.)
(No Model.) 3 Sheets—Sheet 1.

WITNESSES:
Harry J. Garman
John S. Lynch

INVENTOR:
Benjamin G. Luther
BY S. Scholfield
ATTY.

No. 673,322. Patented Apr. 30, 1901.
B. G. LUTHER.
EDGING MACHINE.
(Application filed Sept. 12, 1899.)
(No Model.) 3 Sheets—Sheet 2.
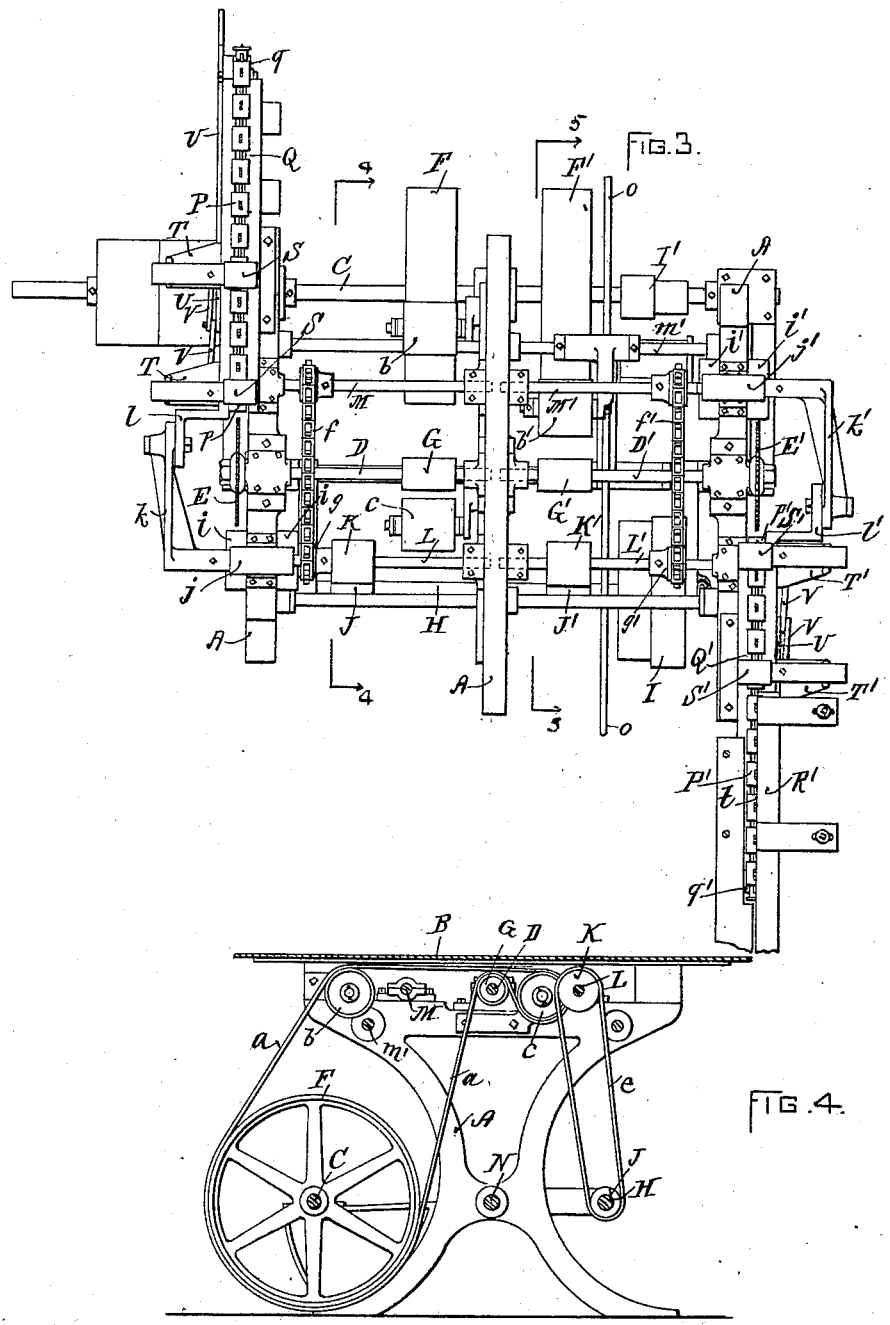

No. 673,322. Patented Apr. 30, 1901.
B. G. LUTHER.
EDGING MACHINE.
(Application filed Sept. 12, 1899.)

(No Model.) 3 Sheets—Sheet 3.

WITNESSES: INVENTOR:
Harry J. Garecan Benjamin G. Luther
Andrew J. Pitcher BY S. Scholfield
ATTY.

THE NORRIS PETERS CO., PHOTO-LITHO., WASHINGTON, D. C.

UNITED STATES PATENT OFFICE.

BENJAMIN G. LUTHER, OF WORCESTER, MASSACHUSETTS.

EDGING-MACHINE.

SPECIFICATION forming part of Letters Patent No. 673,322, dated April 30, 1901.

Application filed September 12, 1899. Serial No. 730,263. (No model.)

*To all whom it may concern:*

Be it known that I, BENJAMIN G. LUTHER, a citizen of the United States, residing at Worcester, in the State of Massachusetts, have invented a new and useful Improvement in Edging-Machines, of which the following is a specification.

The object of my invention is to construct an edging-machine for box-boards which will operate to the best advantage and with the minimum of waste; and it consists in the improved arrangement and combination of parts, as hereinafter fully set forth.

Figures 1, 2:
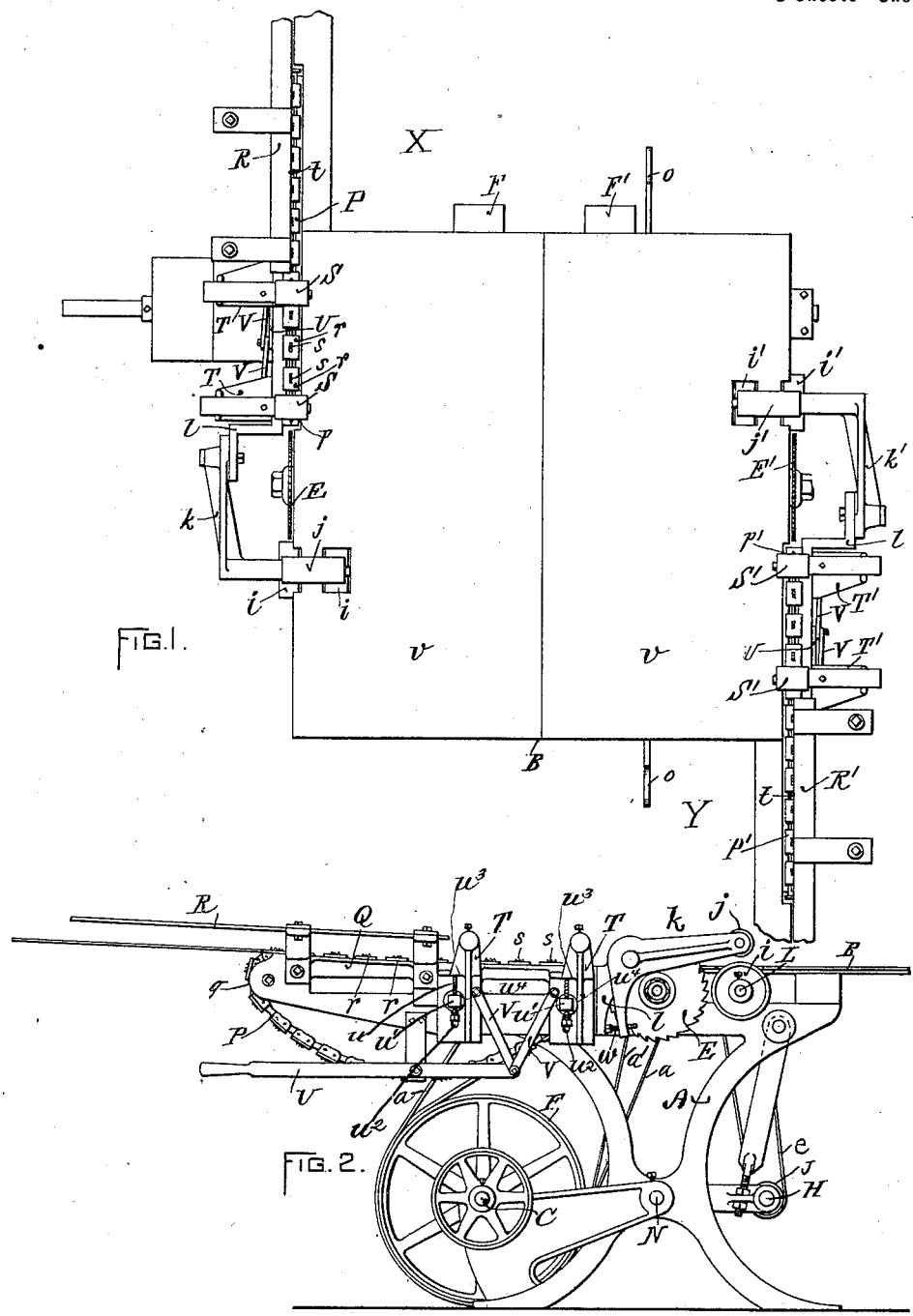
Figure 5:
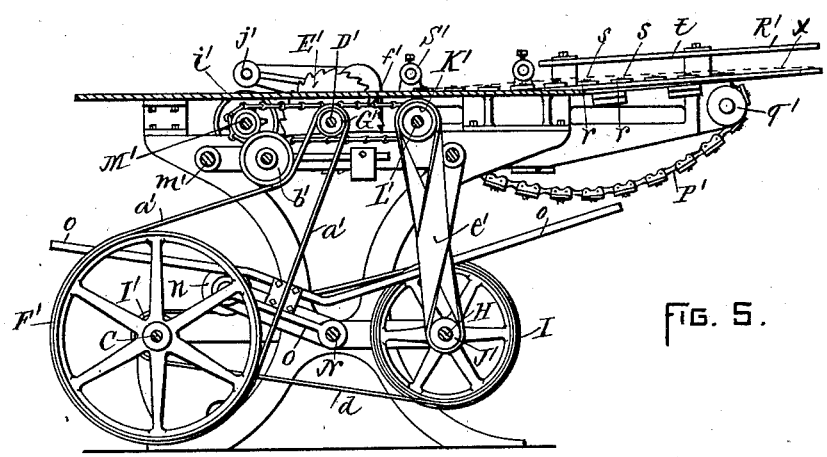
Figure 6:
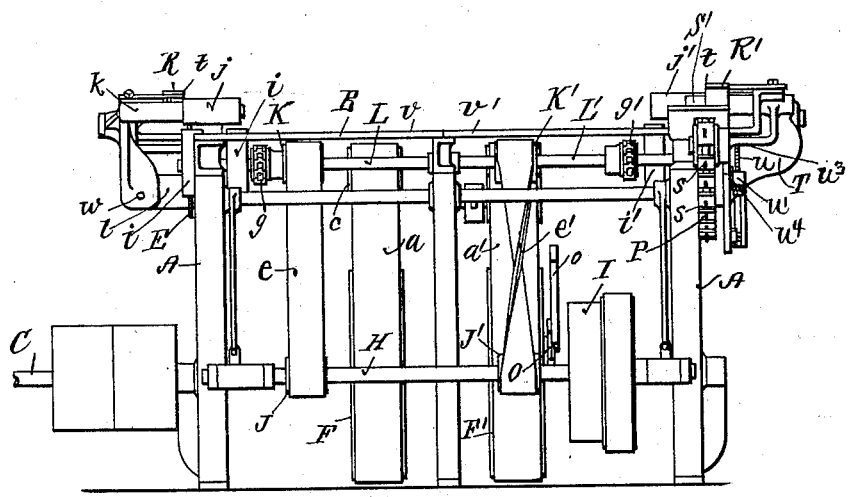

In the accompanying drawings, Figure 1 represents a top view of the machine. Fig. 2 represents a side elevation of the same. Fig. 3 represents a top view with the table removed from the machine. Fig. 4 represents a section taken in the line 4 4 of Fig. 3. Fig. 5 represents a section taken in the line 5 5 of Fig. 3. Fig. 6 represents an end elevation of the machine.

In the drawings, A represents the frame of the machine; B, the table, made in two parts $v\ v'$; C, the driving-shaft; D D', the saw-arbors, and E E' the saws, which are driven in opposite directions. The saw-arbor D is driven from the pulley F, secured to the driving-shaft C by means of the belt $a$, which passes from the pulley F around the idler-pulley $b$, thence around the idler-pulley $c$, and thence over the pulley G of the saw-arbor D back to the pulley F, the idler-pulley $c$ being preferably made adjustable for the purpose of tightening the belt. The opposite saw-arbor D' is driven from the pulley F' upon the driving-shaft C by means of the belt $a'$, which passes from the pulley F' under the tightening-pulley $b'$, pivoted upon the rod $m$, and over the pulley G' upon the saw-arbor D' and back to the pulley F'. The shaft H is provided with the attached cone-pulley I and the pulleys J and J', the said shaft H and cone-pulley I being driven from the shaft C by means of the cone-pulley I' and the belt $d$, and from the pulley J upon the shaft H operative connection is made with the pulley K upon the shaft L by means of the open belt $e$, and from the pulley J' upon the said shaft H operative connection is made with the pulley K' upon the shaft L' by means of the crossed belt $e'$, the said shafts L and L', which thus revolve in opposite directions, serving, by means of the connecting chain bands $f f'$ and sprocket-wheels $g g'$, to operate the shafts M and M' also in opposite directions. Upon the outer end of the shaft L is secured the feeding-roll $i$, and upon the outer end of the shaft M' is secured the feeding-roll $i'$, and over the said feeding-rolls $i$ and $i'$ are arranged the pressure-rolls $j$ and $j'$, which are held upon the pivoted arms $k\ k'$, connected with the frame by means of the brackets $l\ l'$, so that the weight of the pressure-rolls will serve to hold the board firmly in contact with the surface of the feeding-rolls $i\ i'$, which serve to carry the board away from the saw when the edging has been completed, and the position of the pressure-rolls $j$ and $j'$ above the feeding-rolls $i$ and $i'$ to suit boards of different thicknesses is regulated by means of adjusting-screws $w$.

Upon the tie-rod N is pivoted the arm O, which carries at its outer end the roll $n$ for tightening the belt $d$ upon the cone-pulleys I and I', and from the arm O the hand-lever $o$ extends in both directions, and by means of the hand-lever $o$ the belt $d$ may be slackened, thus causing the stoppage of the feeding mechanism.

The outer ends of the shafts M and L' are provided with the sprocket-wheels $p\ p'$, which serve to drive the feed-chains P P', the said feed-chains being made to pass over the rollers $q\ q'$, which are located at the outer ends of the grooved guideways Q Q' for the feed-chains, the said grooved guideways being made in downwardly-curved form, as indicated by the dotted line $x$ in Fig. 5. The several links $r\ r$ of the feed-chains P P' are provided with the upwardly-projecting spurs $s\ s$, which engage with the under side of the strip which is to be sawed from the edge of the board, and in the vertical plane of the spurs $s\ s$ are placed the edges $t$ of the guides R R', which serve to properly guide the operator in locating the edge of the board when the links of the chain are covered by the same. Over the feed-chains are placed the pressure-rollers S S S' S', which are held for up-and-down movement and vertical adjustment by means of the vertically-sliding brackets T T T' T', the downward positions of which are regulated by means of the adjusting-screws $u\ u$, so as to adapt the machine for feeding-boards of the required thickness, and the pressure-rollers S S and S' S' are raised from the feed-chains for the convenient insertion of the boards by means of the hand-levers U and the links V V, which serve to connect the ends of the levers U with the adjacent sliding brackets T T or T' T'. The adjusting-screws $u$ $u$ are held in the studs $u'$ $u'$, which are attached to the frame of the machine and pass through the slots $u^2$ $u^2$ in the sliding brackets, the points of the said screws engaging with the shoulders $u^3$ $u^3$ of the brackets, and the flanges $u^4$ $u^4$ of the studs serving to hold the brackets in place.

The machine as shown in the drawings is double in its working parts, the parts upon one side being nearly the same as those upon the other, the said parts being in their location staggered with each other, so that the machine may be conveniently operated by two persons, one to pass the board in one direction at one side of the machine to saw off one edge and the other person to return the board at the opposite side of the machine to saw off the other edge, and this staggered arrangement of the parts of the machine constitutes an important feature of my invention.

The full operation of the machine will be as follows: One operator being stationed at the side X and the other at the side Y, the operator at X places a box-board upon the feed-chain P in proper range with the saw E as determined by the edge $t$ of the guide R, whereby the edge of the board may be trued up with the minimum waste of stock and the pressure-rolls S S brought down upon the upper surface of the board to hold the same upon the spurs $s$ $s$ of the feed-chain. The guiding-groove of the said feed-chain being made on a downward curve causes the outer end only of the board to be engaged firmly with the spurs of the chain, thus preventing the board from being turned out of its true path in its passage to the saw, and when the board has progressed beyond the saw the action of the feeding-rolls I and the pressure-roll $j$ will cause the continued forward movement of the board and its delivery to the operator at Y, who then engages the opposite edges of the board with the feed-chain P' in proper range with the saw E', and as the board is fed along to the saw by the action of the feed-chain and the pressure-rollers S' S' the edge of the board will be properly trued by the action of the saw, the removed strip passing downward to the floor without obstruction at the back of the saw.

I claim as my invention—

1. In an edging-machine, the combination of the saw, and means for rotating the same, with a downwardly-curved feeding-chain provided with engaging spurs, and held in a downwardly-curved guide, whereby the outer end of the board will be caused to engage with the spurs of the chain, and not its middle portion, substantially as described.

2. In an edging-machine, the combination of the saw, and means for rotating the same, with a downwardly-curved feeding-chain provided with engaging spurs, and a raised guide, having its edge about in the vertical plane of the line of the spurs of the downwardly-curved chain, whereby the operator is enabled to properly locate the rear end of the board, when the spurs of the chain are covered thereby, substantially as described.

3. In an edging-machine, the combination of the saw, and the downwardly-curved feed-chain provided with the engaging spurs, with the duplicate, connectedly-operated pressure-rollers, for holding the board in contact with the spurs of the chain, substantially as described.

4. In an edging-machine, the combination of the downwardly-curved feed-chain provided with the engaging spurs, and the connectedly-operated pressure-rollers for holding the board upon the chain, with the saw arranged in the line of the feed-chain beyond the outer side of the frame of the machine, and the feeding and pressure rolls, beyond the saw, substantially as described.

BENJAMIN G. LUTHER.

Witnesses:
SOCRATES SCHOLFIELD,
HARRY J. GARCEAU.